(12) United States Patent
Platzer et al.

(10) Patent No.: US 11,728,886 B2
(45) Date of Patent: Aug. 15, 2023

(54) SATELLITE OPERATING SYSTEM, ARCHITECTURE, TESTING AND RADIO COMMUNICATION SYSTEM

(71) Applicant: Spire Global Subsidiary, Inc., San Francisco, CA (US)

(72) Inventors: Peter Platzer, San Francisco, CA (US); Joel Spark, Calgary (CA); Jesse Trutna, Eureka, CA (US); Jeroen Cappaert, Sint-Gillis-Waas (BE)

(73) Assignee: SPIRE GLOBAL SUBSIDIARY, INC., San Francisco, CA (US)

( * ) Notice: Subject to any disclaimer, the term of this patent is extended or adjusted under 35 U.S.C. 154(b) by 0 days.

(21) Appl. No.: 17/322,824

(22) Filed: May 17, 2021

(65) Prior Publication Data

US 2021/0273720 A1    Sep. 2, 2021

Related U.S. Application Data

(63) Continuation of application No. 15/611,139, filed on Jun. 1, 2017, now Pat. No. 11,012,148, which is a continuation of application No. 14/515,142, filed on Oct. 15, 2014, now Pat. No. 9,673,889.

(51) Int. Cl.
*H04B 7/195*   (2006.01)
*H04B 7/185*   (2006.01)
*H04W 24/02*   (2009.01)

(52) U.S. Cl.
CPC ......... *H04B 7/195* (2013.01); *H04B 7/18513* (2013.01); *H04W 24/02* (2013.01)

(58) Field of Classification Search
CPC ..................................................... H04B 7/195
See application file for complete search history.

(56) References Cited

U.S. PATENT DOCUMENTS

| | | |
|---|---|---|
| 4,454,510 A | 6/1984 | Crow |
| 5,410,728 A | 4/1995 | Bertiger et al. |
| 5,604,920 A | 2/1997 | Bertiger et al. |

(Continued)

FOREIGN PATENT DOCUMENTS

| | | |
|---|---|---|
| EP | 1037405 A2 | 9/2000 |
| WO | 2014121197 A2 | 8/2014 |

OTHER PUBLICATIONS

Carson-Jackson, "Satellite AIS—Developing Technology or Existing Capability?", The Journal of Navigation 2012, vol. 65, pp. 303-321.

(Continued)

*Primary Examiner* — Abdeltif Ajid
(74) *Attorney, Agent, or Firm* — Steven M. Koehler; Westman, Champlin & Koehler, P.A.

(57) ABSTRACT

A cubesat communication system implementing addressable data packet for transmitting information collected by the cubesat to one or more receive-only ground stations. The cubesat may transmit information to the receive-only ground stations according to a scheduler. The receive-only ground stations may receive information from the cubesat without sending any commands to the cubesat to prompt transmission and re-transmit to a central common station using a bent pipe streaming protocol. Information between the cubesat and the ground station may be transmitted via a connectionless, datagram network protocol.

12 Claims, 10 Drawing Sheets

(56) References Cited

U.S. PATENT DOCUMENTS

| | | | |
|---|---|---|---|
| 5,940,739 A * | 8/1999 | Conrad | H04B 7/18519 |
| | | | 455/430 |
| 5,963,166 A | 10/1999 | Kamel | |
| 6,067,453 A | 5/2000 | Adiwoso et al. | |
| 6,253,080 B1 | 6/2001 | Wiedeman et al. | |
| 6,271,877 B1 | 8/2001 | LeCompte | |
| 6,381,228 B1 | 4/2002 | Prieto, Jr. et al. | |
| 6,584,452 B1 | 6/2003 | Prieto, Jr. et al. | |
| 6,822,742 B1 | 11/2004 | Kalayeh et al. | |
| 8,411,969 B1 | 4/2013 | Joslin et al. | |
| 2002/0175853 A1* | 11/2002 | Peeters | G01S 5/06 |
| | | | 342/353 |
| 2003/0001775 A1 | 1/2003 | Turner | |
| 2003/0217362 A1 | 11/2003 | Summers et al. | |
| 2004/0088113 A1 | 5/2004 | Spoonhower et al. | |
| 2004/0147223 A1* | 7/2004 | Cho | H04L 12/66 |
| | | | 455/552.1 |
| 2004/0263386 A1 | 12/2004 | King et al. | |
| 2007/0143598 A1 | 6/2007 | Partridge et al. | |
| 2007/0182628 A1 | 8/2007 | Pomerantz et al. | |
| 2008/0071633 A1 | 3/2008 | Ozkan et al. | |
| 2009/0007240 A1 | 1/2009 | Vantalon et al. | |
| 2009/0290534 A1 | 11/2009 | Connors et al. | |
| 2011/0081050 A1 | 4/2011 | Chen | |
| 2011/0116441 A1 | 5/2011 | Wyler | |
| 2011/0212320 A1 | 9/2011 | Greenhill et al. | |
| 2012/0018585 A1 | 1/2012 | Liu et al. | |
| 2012/0020280 A1* | 1/2012 | Jansson | H04B 7/18582 |
| | | | 370/316 |
| 2013/0018529 A1 | 1/2013 | Ploschnitznig | |
| 2013/0142295 A1* | 6/2013 | Badke | G01S 19/36 |
| | | | 375/350 |
| 2014/0354477 A1 | 12/2014 | Robinson | |
| 2016/0011318 A1 | 1/2016 | Cohen | |
| 2016/0056957 A1 | 2/2016 | Clarke et al. | |
| 2016/0087713 A1 | 3/2016 | Oderman et al. | |

OTHER PUBLICATIONS

European Search Report dated Jul. 22, 2016 issued in corresponding European Patent Application No. 14745871.5.

International Search Report and Written Opinion dated Apr. 27, 2016 issued in corresponding PCT International Application No. PCT/US2015/054906.

* cited by examiner

SATELLITE OPERATING SYSTEM, ARCHITECTURE, TESTING AND RADIO COMMUNICATION SYSTEM

CROSS REFERENCE TO RELATED PATENT APPLICATIONS

This application is a continuation of U.S. patent application Ser. No. 15/611,139, filed Jun. 1, 2017, which is a continuation of U.S. application Ser. No. 14/515,142, filed Oct. 15, 2014, and issued on Jun. 6, 2017 as U.S. Pat. No. 9,673,889, the entire contents of which is incorporates by reference the following U.S. patent applications: (1) Ser. No. 13/757,062, title: system and method for widespread low cost orbital satellite access filed on Feb. 1, 2014; (2) Ser. No. 13/961,875, title: computerized nano-satellite platform for large ocean vessel tracking filed on Aug. 7, 2014; and (3) Ser. No. 13/961,384, title: system and method for high-resolution radio occultation measurement through the atmosphere filed on Aug. 7, 2013. The contents of these three applications are incorporated by reference herein as if each was restated in full.

FIELD OF THE INVENTION

The inventions herein are directed to novel systems and methods for supporting inter-satellite and satellite-ground communications. In particular, the present invention is directed to systems and programming used to implement a network of small factor satellites, and a constellation architecture for space and ground operations to support data collection and management.

BACKGROUND

Traditional satellite infrastructure has relied on the use of a small number of large, powerful satellites that generally use custom operating systems and point-to-point communication links. However, these large, powerful satellites are expensive to build and deploy.

Over the years, a growing interest in reducing satellite manufacture and deployment costs has lead to the development of small factor satellites. Small factor satellites can be deployed in low earth orbit. Small factor satellites include but not limited to nano-satellites. Small factor satellites are hereinafter referred to as cubesats. Due to their smaller size, cubesats generally cost less to build and deploy into orbit above the Earth. As a result, cubesats present opportunities for educational institutions, governments, and commercial entities to launch and deploy cubesats for a variety of purposes with fewer costs compared to traditional, large satellites.

The use of a large constellation of independent small satellites allows for greatly reduced revisit time and message latency. However, operating the large constellation of independent satellites in earth orbit has many direct challenges in data collection, management, local processing and transmission, and imposes higher flexibility and coordination requirements. For example, existing technology for small form factor satellites, like present day cubesat space protocol (CSP), mimic traditional communication protocols. This can make it difficult to distinguish signals from individual satellites when contact regions overlap. Further, because sensor data for a particular region spreads across multiple satellites, and further because reduced power budgets limit transmission bandwidth, coordinating data retrieval becomes a much more complex task under existing systems.

Therefore, there is a need for a fast, cost-efficient, and simple mechanism to coordinate and transmit information in and across an orbital network.

SUMMARY

The disclosed technology relates to an orbital satellite communication system in a communication network. The system includes multiple satellites circling the earth and an on-board receiver and transmitter for each satellite. The receiver on the first satellite forms a first transmission link with a second satellite in the network. The receiver receives data packets from the second orbital satellite via the first transmission link. The first satellite includes a transmitter forming a second transmission link—a link that may include a ground station or other satellites. The satellites in the system include on-board processors in communication with the receiver and the transmitter. The processor is selectively programmed and controls the transmission of the received data packets to the ground station. The processor determines a destination address uniquely identifying the receiver—whether a second satellite or a ground station. The processor may also transmit the data packets to the destination address via the second transmission link.

A further aspect of the disclosed technology relates to a method of transmitting information from an orbit satellite communication system to a ground station and ultimately to a central command center ("CCC") for all incoming satellite data. Ground stations may be hardwired into a terrestrial network and thus do not need wireless transmission systems—in essence a receive-only collection station. Ground stations also are configured in as a "bent pipe" retransmission system—where the incoming data is simply redirected to the CCC by the GS without a stop and resend command; in effect, network traffic relay device. This avoids the delay of manual logins and batch processing of data collected at each GS using DPN protocols. In addition, using Ethernet/hardwire links, or a cell network to communicate data back to the CCC often avoids regulatory issues in the local community for the GS. GS design can be made sufficiently simple and small that permanent installation locations may not be necessary; and GS design can allow for mobile operation energized by local power—such as solar panels or the like.

Receive only GS can include a synchronized clock and program schedule for incoming data (condition based scheduler using HSTP—high speed transfer protocol). This would reduce the need for "request-response" data collection and pass-through to CCC. This takes advantage of the fact that the satellites are aware their own location, of time and GS location. Accordingly, as dictated by the scheduler, the satellite selectively transmits to a single GS without the need for a prompt.

Information collected by a satellite is initially coded for transmission locally. In one arrangement, a processor divides the detected information into a plurality of data packets. The method may determine a destination address uniquely identifying a second orbital satellite. The second orbital satellite may have a first transmission link with a ground station. Data packets may be transmitted to the destination address via a second transmission link for further transmission to the ground station via the first transmission link. As large files are collected at the CCC, a feedback signal informs the satellite regarding what remains to be received—so that the subsequent transmissions are limited to data missing from the original transmission.

A still further aspect of the disclosed technology relates to a ground station system. The system may include a software-defined radio (SDR) system configured to modulate and demodulate radio signals. The system may also include a processor in communication with the SDR system. The processor may receive data packets broadcast by a satellite via the SDR system. The processor may identify from the data packets a source address that uniquely identifies the satellite. Data packets associated with the source address may be assembled to form a message.

BRIEF DESCRIPTION OF THE DRAWINGS

The following Detailed Description of the technology is better understood when read in conjunction with the appended drawings. For the purposes of illustration, there is shown in the drawings exemplary embodiments, but the subject matter is not limited to the specific elements and instrumentalities disclosed. Components in the figures are shown for illustration purposes only, and may not be drawn to scale.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present application relates to a terrestrial and orbital communication network having a constellation of cubesats. Each cubesat may be regarded as a node in the network. The network may also include earth surface nodes placed within the orbiting paths of the cubesats. Such earth surface nodes may include ground stations for reception of messages broadcast by the cubesats.

Figure 1:
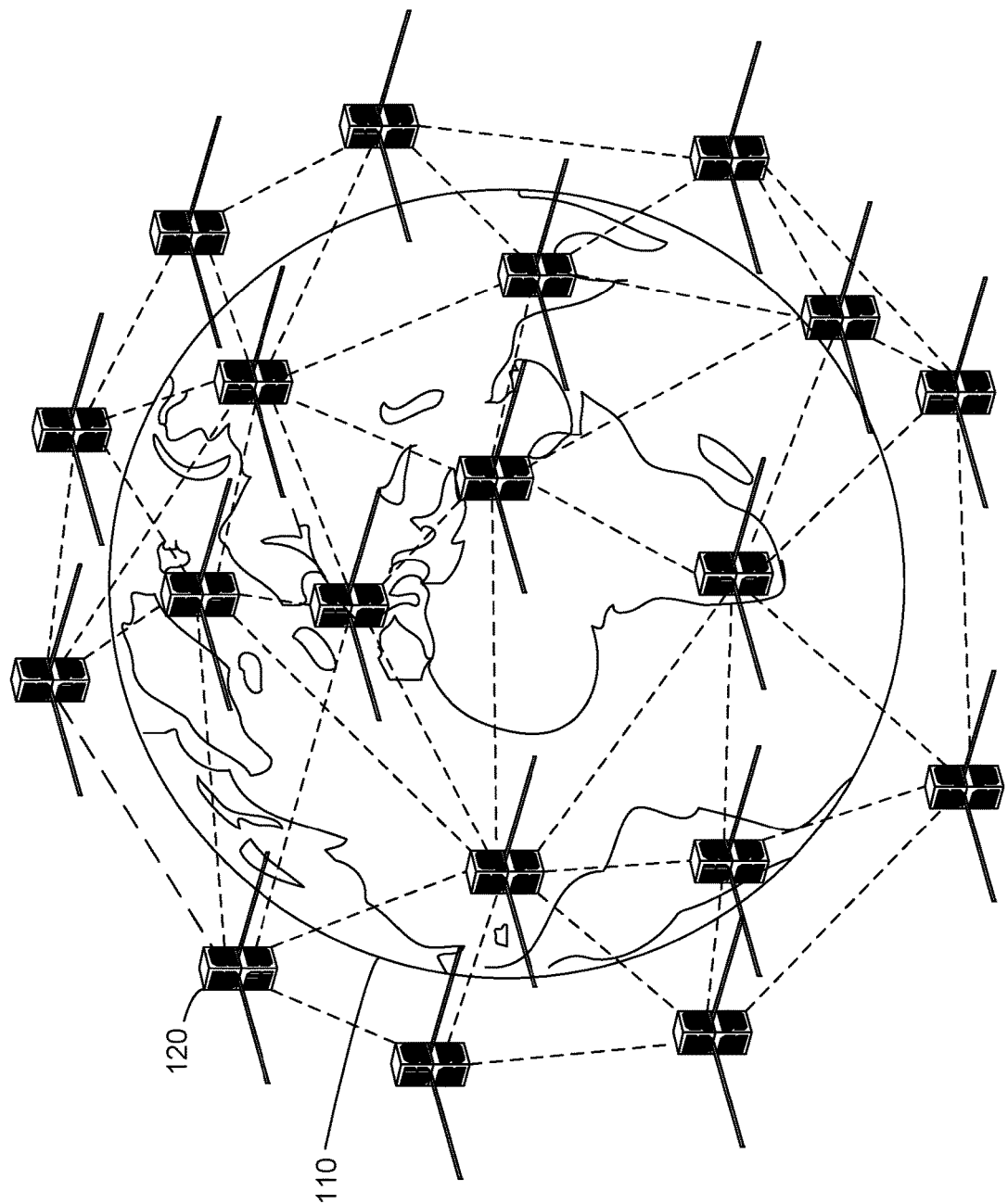
FIG. 1 illustrates an example terrestrial and orbital communication network according to one aspect of the present technology.

FIG. 1 illustrates am exemplary terrestrial and orbital communication network 100 covering at least a portion of a planet 110, such as the Earth. The network 100 may include a constellation of satellites 120 each configured to collect data from a point on the planet from time to time or on a regular basis. The satellite 120 may analyze the collected data to monitor maritime activities, including but not limited to tracking ship or oceangoing vessels, detecting illegal, unreported and unregulated fishing or pirate activities, monitoring trade transit, and detecting oil spill, among other possibilities.

At least one or more satellites 120 may be a cubesat having a small form factor. For instance, the size of a satellite 120 may be relatively small, in general not exceeding 10 cm×10 cm×30 cm and 10 kg of mass. In one embodiment, the satellite 120 may be based on an industry standard, developed in 2001 by Stanford University and California Polytechnic Institute and described in the document "CubeSat Design Specification."

The satellite 120 may be tracked by the North American Aerospace Defense Command. Orbit of the satellite 120 may be presented in the format of a two-line element set. Position of the satellite 120 at any particular time may be determined based on the two-line element set.

The satellite 120 may be implemented with sophisticated software and related computer systems designs. The satellite 120 may implement real time operating system ("R-TOS"). The system may perform real time operation with light burden and low power usage. The system may or may not have a scheduler.

In some embodiments, the satellite 120 may have various sensors connected to and in communication with a central processing unit, such as a processor, of the satellite 120. These sensors may include one of more of the following: a frequency specific monitor such as UV (Ultraviolet) and IR (infrared), a sensor for remote detection of surface temperature, a spectroscopy, an accelerometer, a camera or vision system for still and video capture, a gravimetric sensor, a radar, and a radio transceiver, among other possibilities. The satellite 120 may include a memory to store data collected by one or more sensors. For example, the satellite 120 may include a nonvolatile memory card to store images captured by one or more cameras. The satellite 120 may have one or more light antennas with high gain capabilities.

Figure 2:
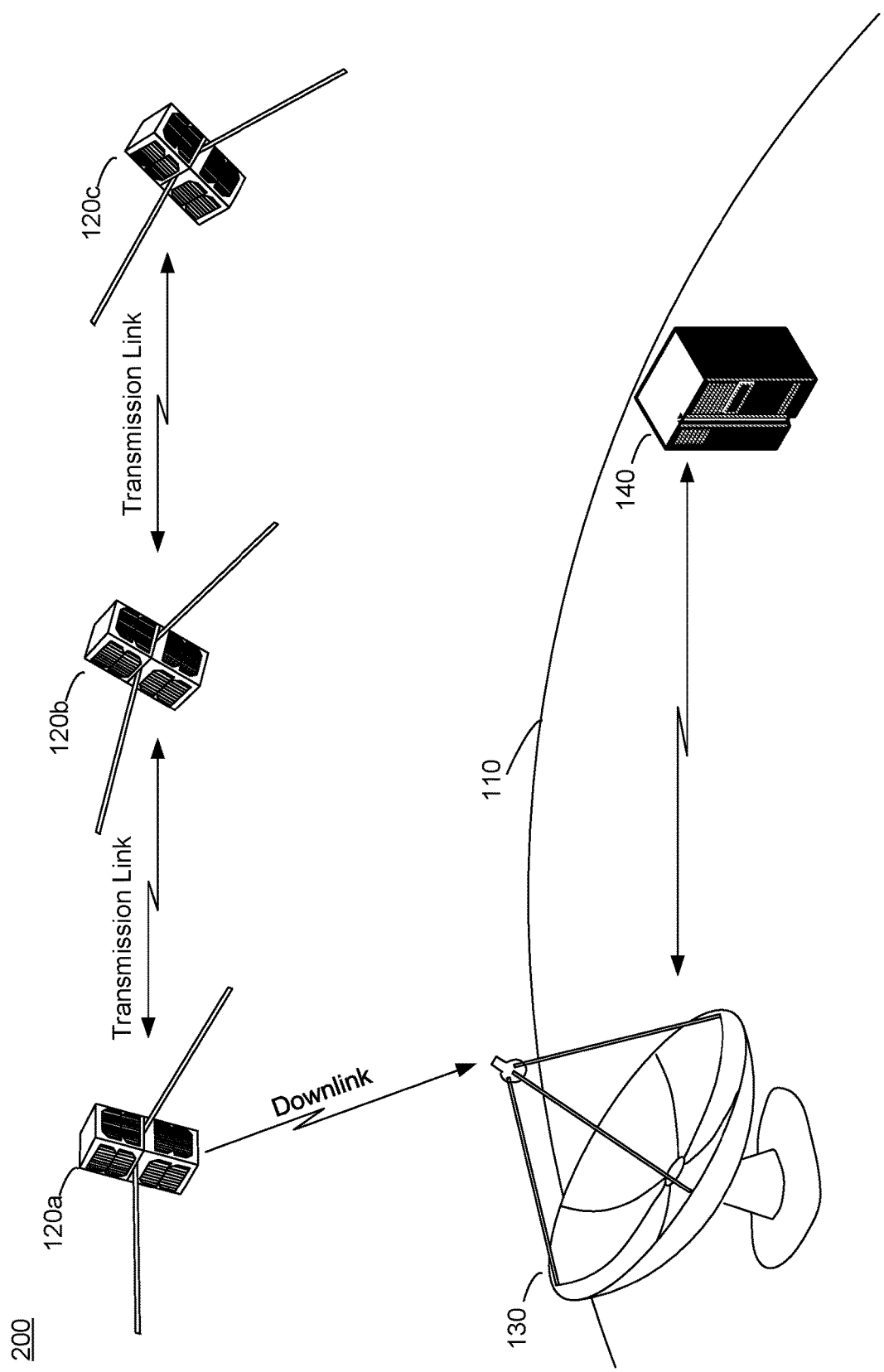
FIG. 2 illustrates a satellite relaying information received from neighbor satellites to a ground station according to one aspect of the present technology.

With reference to FIG. 2, a satellite 120a may broadcast information to other satellites 120b and 120c in the orbital network 100 via one or more transmission links. The satellite may also communicate with one or more ground stations 130 via one or more transmission links. Such a transmission link may include an uplink, downlink or a combination thereof. For example, as illustrated in FIG. 2, the satellite 120a may transmit information to a ground station via a downlink. In some embodiments, the satellite may communicate with non-cubesat satellites. For example, the satellite may also communicate with permanent, large satellites, such as dish network located at 23 k miles geostationary orbit. Each satellite may be identified by a unique identifier, such as a media access control (MAC) address.

The satellite 120 may communicate with a software-defined radio (SDR) system operating on one or more ground stations. The SDR system may be a radio communication system that implements typical hardware components, such as mixers, filters, amplifiers, modulators or demodulators, and detectors, by software means. The SDR system may perform demodulation, filtering of radio frequency or audio frequency, and signal enhancement. The SDR system may include one or more of the following: a receiver, a transmitter, an antenna, an analog-to-digital converter, an amplifier, and a digital signal processor that reads from the converter and transfers stream of data from the converter to other applications. An SDR receiver may also be included on a satellite to implement one or more transmission links with one or more other satellites or one or more ground stations to receive data packets therefrom. The receiver may use a variable-frequency oscillator, mixer and filter to tune a desired signal to a common intermediate frequency or baseband, where it may be then sampled by the analog-to-digital converter. An SDR transmitter on a satellite may form one or more transmission links with one or more other satellites or one or more ground stations to transmit data packets thereto.

Each satellite 120 may communicate with other satellites or the ground stations 130 via a custom networking protocol. The custom network protocol may be a space internet protocol (SIP). The protocol may be a connectionless, datagram protocol similar to User Datagram Protocol (UDP), but with an increased address space. The protocol may have much smaller overhead than traditional IP protocols while retaining support for routing over the terrestrial and orbital network 100. The satellite 120 may transmit information in one direction to another satellite or ground station without verifying the readiness or state of the receiver. For instance, the satellite 120 may send messages, such as datagrams, to other satellites without prior communications to set up special transmission channels or data paths.

In one example, the network protocol may be a customized CSP. Unlike the present day CSP, the customized CSP may distinguish signals from individual satellites when contact regions overlap. The protocol may be a small network-layer delivery protocol designed for cubesats. The protocol may be based on a 32-bit header containing both network and transport layer information. A protocol header may include source port, destination port, source, destination, and other information. In some instances, the satellite 120 may implement broadcast-only file-transfer protocols (FTP) to transfer data.

In one example, the satellite 120 may implement a scheduler, such as scheduling software, to select an optimum path or paths for broadcasting information. The path may include one or more cubesats, one or more ground stations, as well as large, geostationary communication satellites.

With reference to FIG. 2, a satellite 120 may broadcast information to a ground station 130 when the ground station is within the sight of the satellite 120 or within a predetermined range of the satellite 120. As shown in FIG. 2, a ground station 130 may locate on the surface of the Earth 110. The ground station 120 may be a terrestrial terminal station for reception of radio waves generated by one or more satellites 120. The ground station 120 may include an antenna, such as a parabolic antenna. The ground station 120 may communicate with satellites 120 by transmitting and receiving radio waves in high frequency bands, such as microwaves. When the ground station 120 successfully receives radio waves from a satellite 120, or vice versa, a telecommunications link may be established. The ground station 130 may function as a hub connection for a satellite 120, or constellation of satellites with a terrestrial telecommunications network, such as the Internet. In some embodiments, the ground station 130 may upload computer programs or issuing commands over an uplink to a satellite 120. Each ground station 130 may be identified by a unique identifier, such as a MAC address.

Each ground station 130 may include a SDR system for establishing physical layer communication with satellites 120. The SDR may modulate and demodulate information received by the ground station 130 as well as information to be transmitted from the ground station 130. The use of SDR may allow each ground station 130 to be reconfigured dynamically so as to communicate with a wide variety of present and future satellites 120 without requiring site visits or hardware installation.

Figure 3:
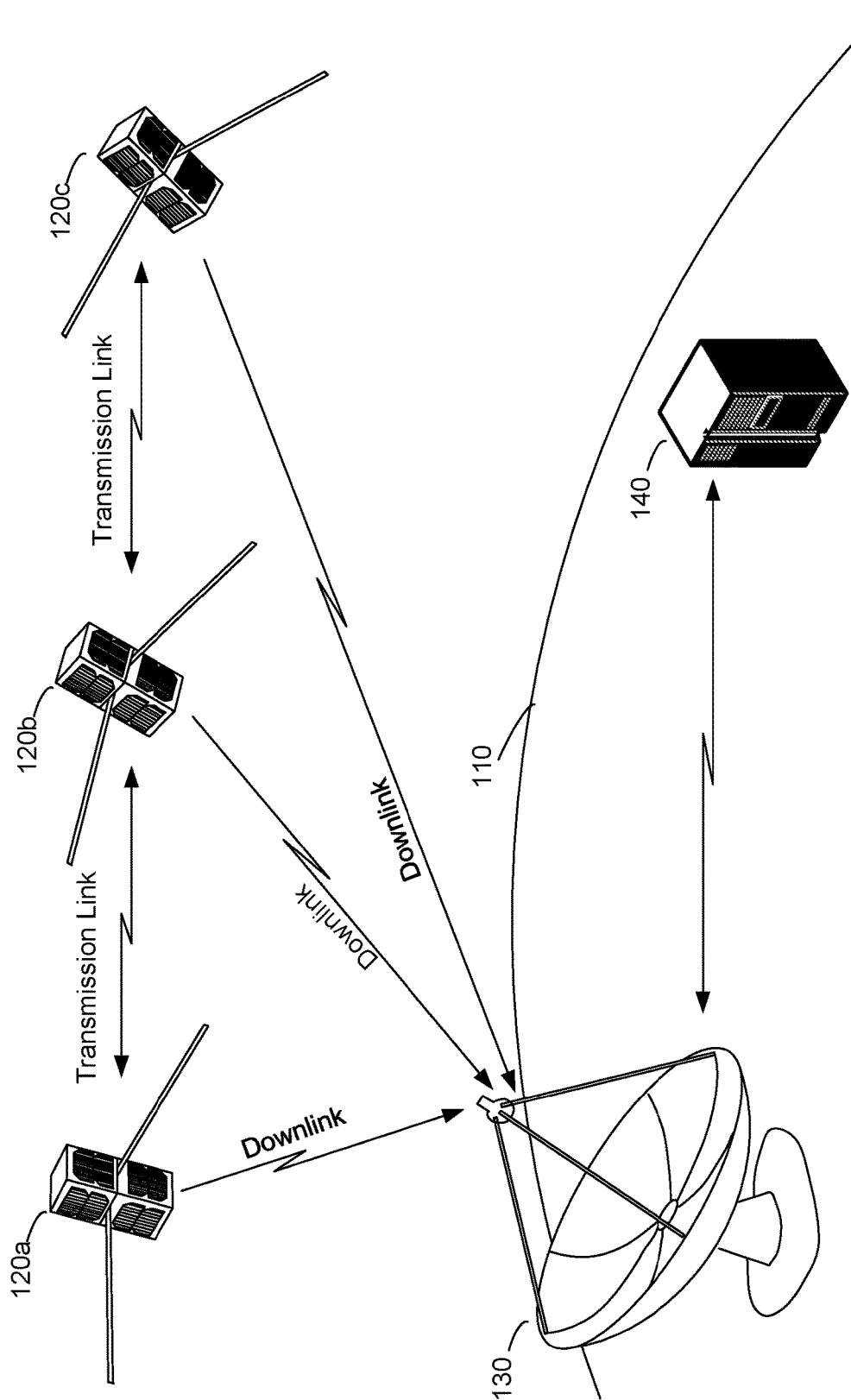
FIG. 3 illustrates one ground station receiving information broadcast from multiple satellites according to one aspect of the present technology.

Ground stations 130 may have various configurations. In one embodiment, the ground station 130 may be a "receive-only" (or referred to as "passive receiver") for tracking and receiving incoming radio transmissions from one or more multiple satellites 120. As depicted in FIGS. 2-3, one or more satellites 120 may establish a downlink with receive-only ground stations 130 to perform download operations. The satellites 120 may perform download operations according to a condition based scheduler. For instance, the satellites 120 may send messages to one or more receive-only ground stations 130 according to a predetermined schedule or instructions provided by a scheduler. In these scenarios, the receive-only ground stations 130 may not need to send any commands to the satellites 120 to prompt transmission.

Receive-only ground stations 130 may be placed in locations and countries with more restrictive regulatory schemes in place. In particular, while individual rules may differ, the most restrictive regulations apply to ground stations having radio transmission capabilities. In particular, many municipalities place no restriction on receive-only ground stations 130. Coupled with novel broadcast-only file-transfer protocols, receive-only ground stations 130 may increase both total bandwidth and greatly reduce latency for time-sensitive transmissions.

With continued reference to FIG. 2, in some embodiments, only one satellite out of a group of satellites may form a communication link with the ground station 130. The remaining satellites in the group do not directly communicate with the ground station 130. For instance, as shown in FIG. 2, satellites 120b and 120c may not form any direct communication link with the ground station 130. The satellite 120a, however, may relay information received from the satellites 120b and 120c to the ground station 130 via a downlink.

In one embodiment, as illustrated in FIG. 3, the ground station 130 may include a stationary omni-directional antenna capable of receiving signals from multiple satellites across the entire horizon. As shown in FIG. 3, the ground station 130 may maintain communications with multiple satellites 120a, 120b and 120c. This embodiment may allow relatively low-bandwidth, receipt-only communication, but may greatly simplify site installation, increase coverage and reduce notification latency.

Figure 4:
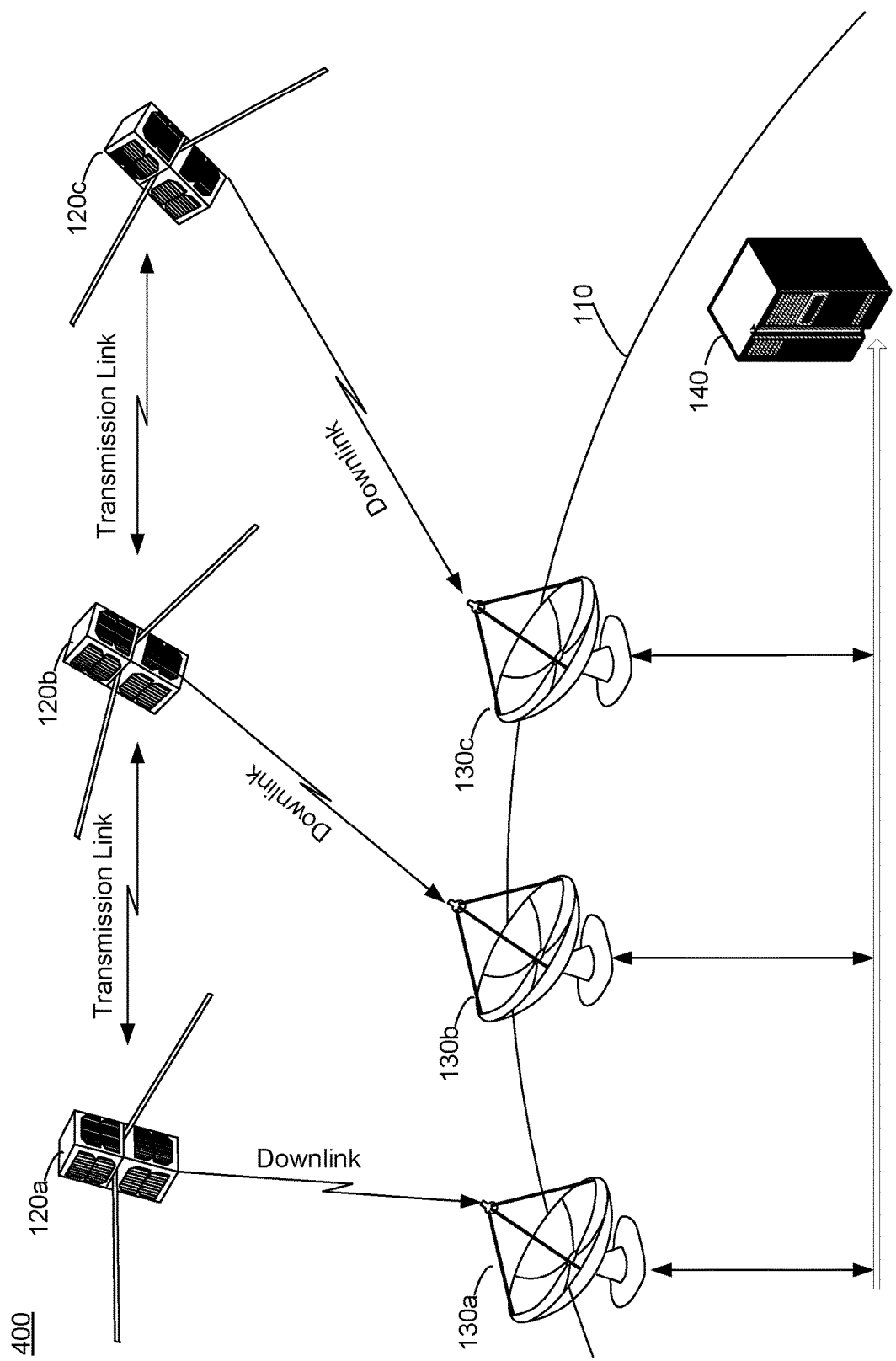
FIG. 4 illustrates multiple ground stations each receiving information broadcast from a satellite according to one aspect of the present technology.

In another embodiment, the ground station 130 may establish point-to-point links through a directional antenna mounted to a rotor which follows satellites 120 across the sky. This embodiment may allow high bandwidth uplink and downlink communications. FIG. 4 illustrates a series of ground stations 130 that may be strategically placed to facilitate tracking of multiple satellites 120 placed in orbit. Each ground station 130 may track one or more orbiting satellites 120. In this embodiment, each satellite 120 may independently communicate with a ground station 130 without relying on other satellites. For instance, satellites 120a, 120b and 120c may establish respective communications with ground stations 130a, 130b and 130c.

Figure 5:
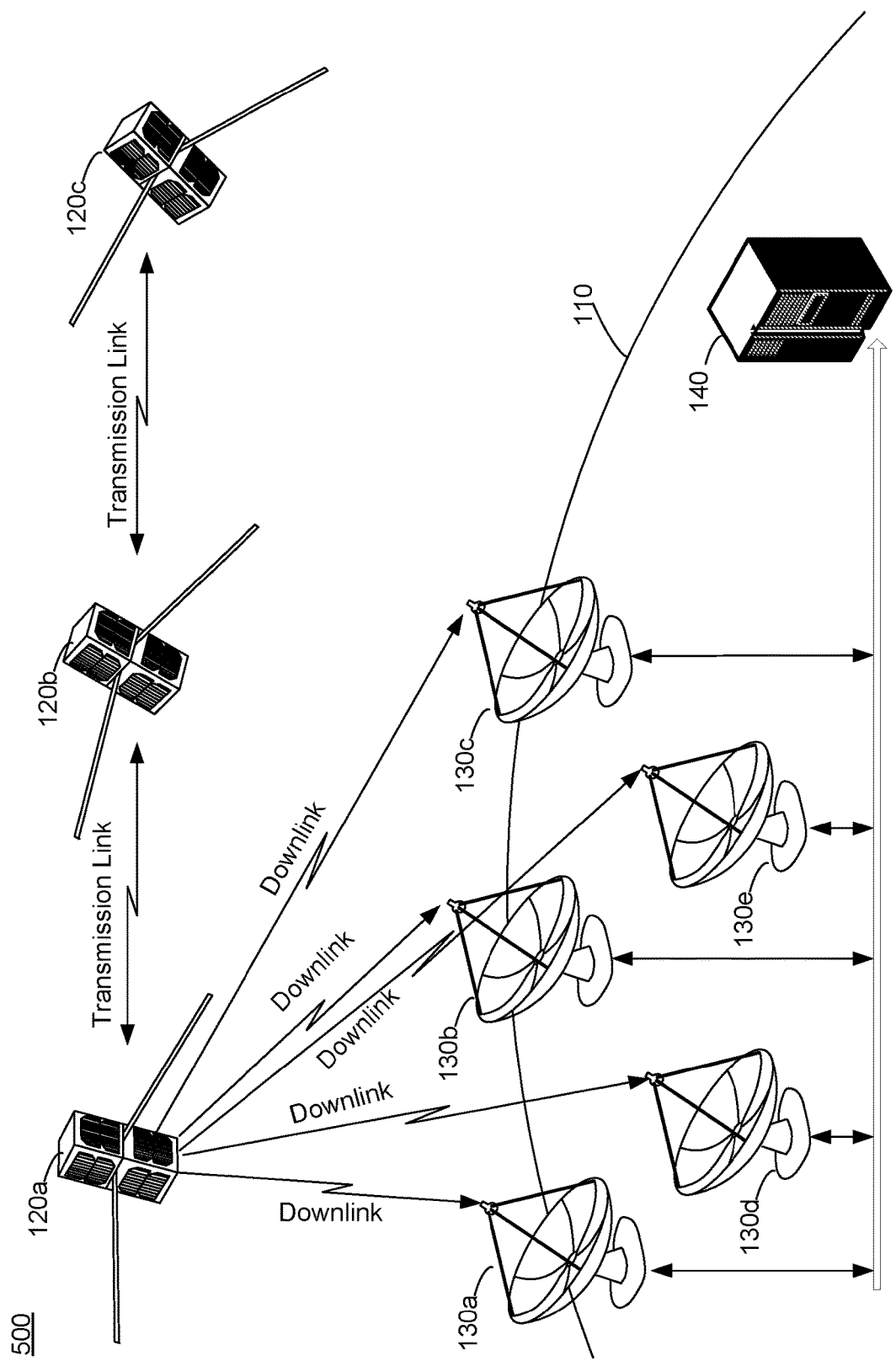
FIG. 5 illustrates one satellite broadcasting information to multiple ground stations according to one aspect of the present technology.

With reference to FIG. 5, a satellite 120a may communicate with more than one ground station 130 at a time. In this embodiment, the satellite 120a may broadcast large amounts of information to multiple receive-only ground stations 130a, 130b, 130c, 130d and 130e via multiple paths. The satellite 120a may transmit the information according to FTP at a high data transmission rate to make the transmission process more rapid and efficient.

The ground station 130 may be configured to relay information to and from one or more satellites 120 within the network 100. In some embodiments, the ground station 130 may be configured to relay information to and from other ground stations or ground-based systems.

In some examples, as illustrated in FIGS. 2-5, the ground station 130 may channel data received from a satellite 120 to a central communication center (CCC) 140. The ground station 130 may forward data to the CCC 140 without interrupting data stream broadcast by the satellite 120. In one embodiment, the ground station 130 may transfer data to the CCC 140 via the Ethernet.

In some examples, one or more ground stations 130 may be linked to the CCC 140 via terrestrial servers sourced by third party vendors such as Amazon servers. In one embodiment, one or more ground stations 130 and one or more CCC 140 may form a secure dedicated private network (DPN) as part of a virtual private network (VPN). The ground station 130 may perform batch transmission to the CCC 140 each time when logging into the DPN.

In other embodiments, centralized command queues may be maintained at server facilities. Data traffic may be directly addressed to individual satellites 120, and network traffic may be routed through ground stations 130 automatically. Operators may be given a global, eventually-consistent view of the state of the satellites 120. Frequent updates of the satellites 120 may be provided to the operators through receive-only ground stations 130.

Figure 6:
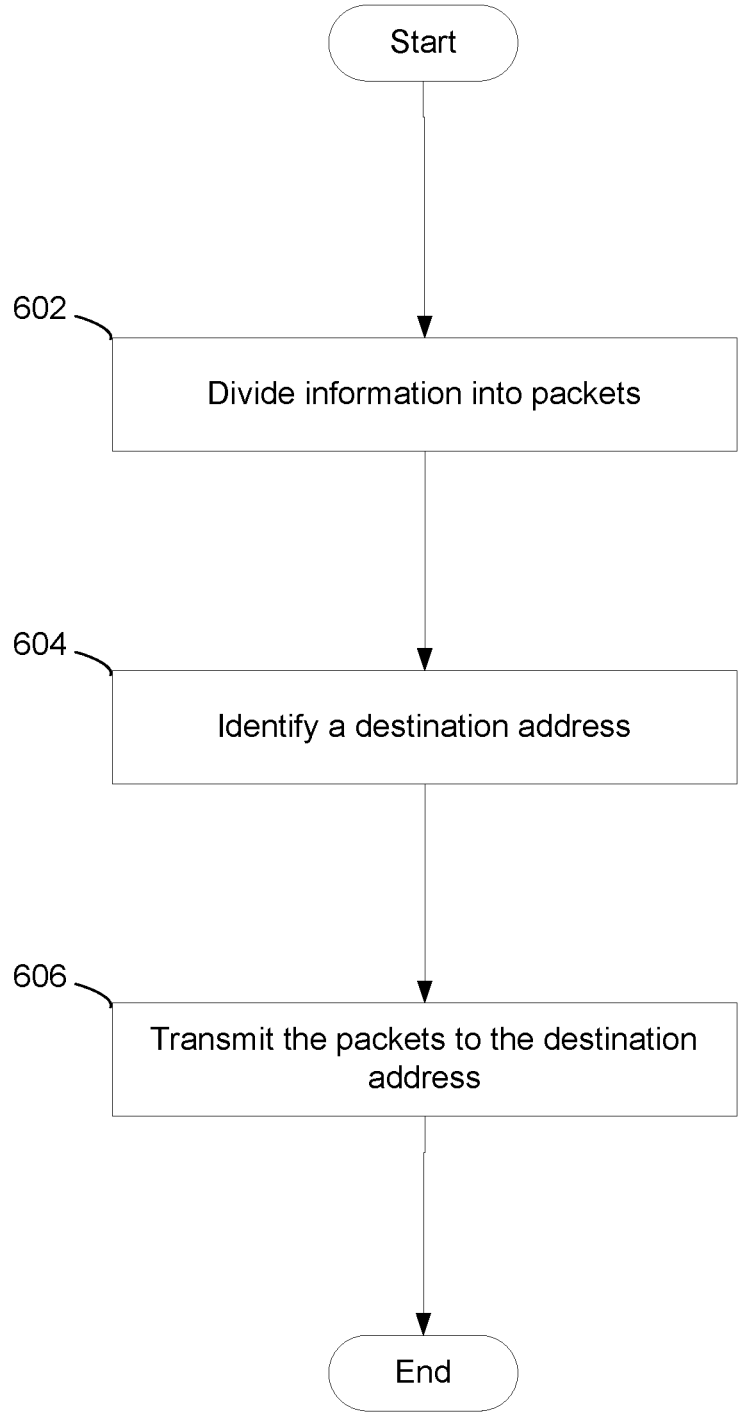
FIG. 6 is a flow chart illustrating steps for broadcasting a message by a satellite according to one aspect of the present technology.

FIG. 6 is a flow chart 600 illustrating example steps to broadcast information, such as a message, by a satellite 120. Steps described herein may be performed by a processor located in the satellite 120. At 602, the satellite 120 may divide information to be broadcast into one or more packets. For large, contiguous data files such as images, the satellite 120 may parse the data files. At 604, the satellite 120 may determine a destination satellite or destination ground station that the information is directed to, and may determine a destination address associated with the destination satellite or destination ground station. The destination address may be a unique identifier associated with the satellite or ground station. In some embodiments, the unique identifier may be a MAC address. At 606, the satellite 120 may broadcast one or more packets via a transmitter, such as an SDR transmitter, to the destination address. The satellite 120 may broadcast the packets according to the SIP protocol. When transmitting large amounts of information, the satellite 120 may broadcast the packets to multiple receive-only ground stations according to FTP at a high data transmission rate to make the transmission process more rapid and efficient.

Figure 7:
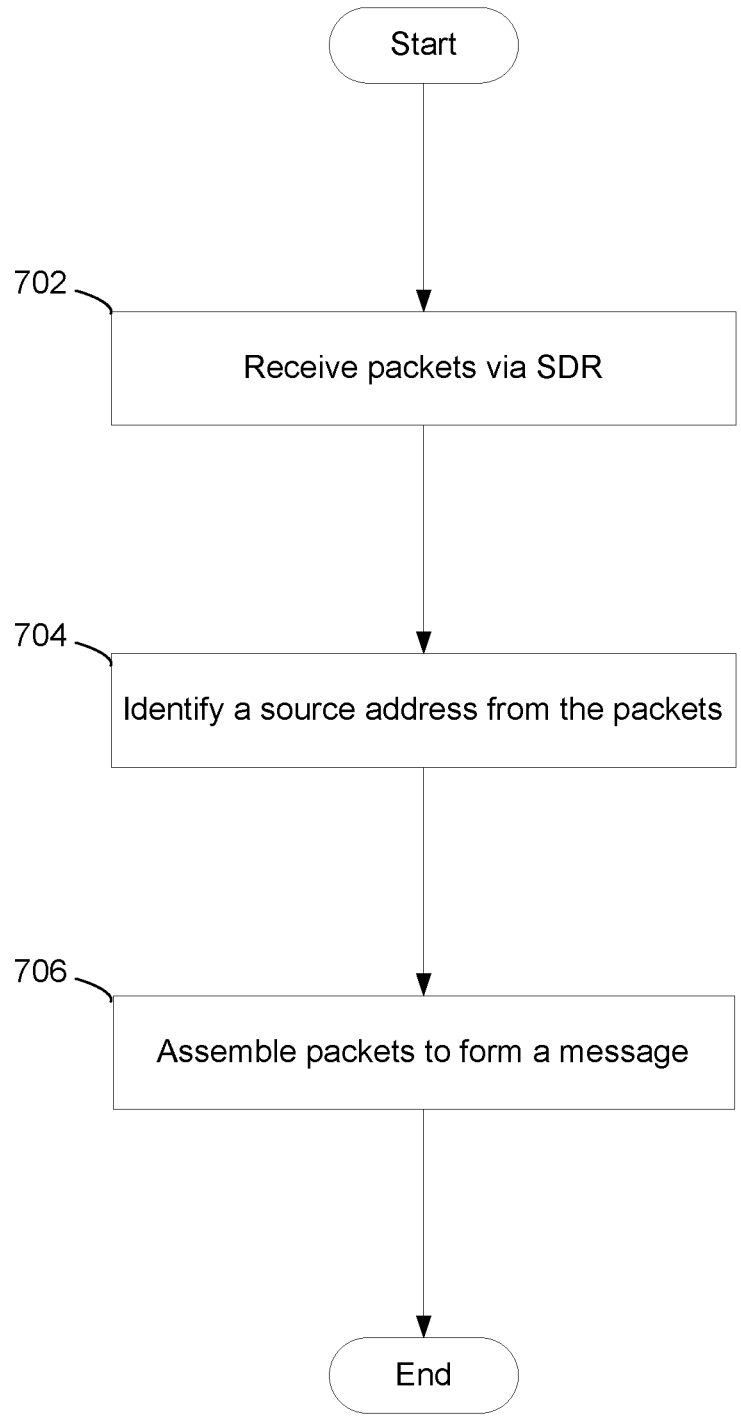
FIG. 7 is a flow chart illustrating steps for receiving a broadcast message by a ground station according to one aspect of the present technology.

FIG. 7 is a flow chart 700 illustrating steps to receive a broadcast message by a ground station 130. Steps described herein may be performed by a processor located at the ground station 130. At 702, the ground station 130 may receive one or more packets via SDR. At 704, the ground station 130 may identify a source address from the packets to determine the sender of the packets. At 706, the ground station 130 may assemble packets broadcast by the same sender to form one or more complete messages.

Figure 8:
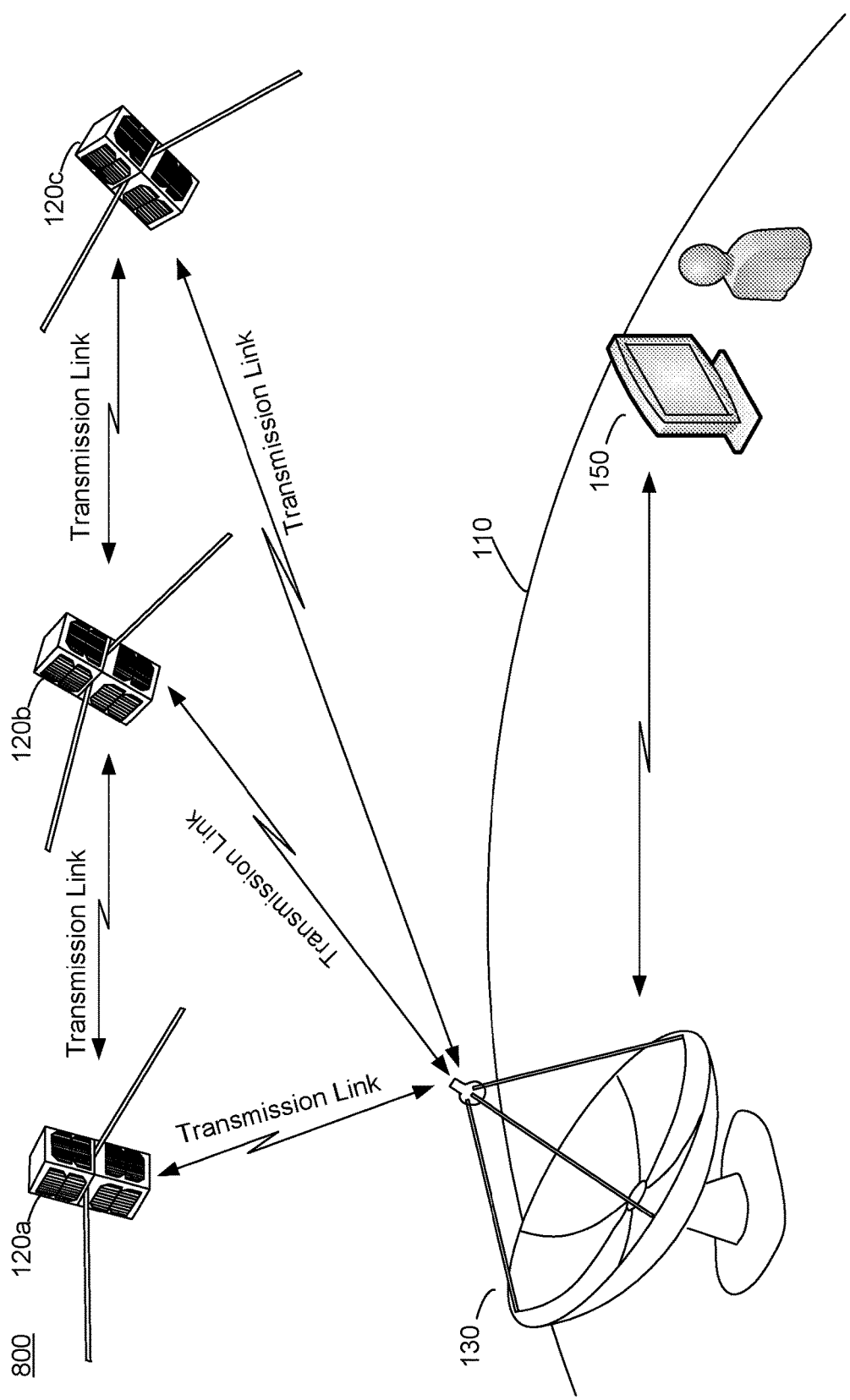
FIG. 8 illustrates an environment for leasing one or more satellites by a third party to execute its proprietary program according to one aspect of the present technology.

According to one aspect of the present technology, each satellite 120 may have both programming memory and processor available for local or on-board data processing. By way of example, as illustrated in FIG. 8, a third party 150 may lease processing time from one or more satellites, transmit and load a proprietary program to a satellite for local execution on the satellite. Different pieces of the proprietary program may be uploaded to the satellite.

In an example, during a pre-selected window of time or by remote command, the proprietary program provided by the third party may be instanced. The proprietary program may manipulate on-board sensors of the satellite 120 to collect specified data. The satellite 120 may locally store the collected data, and locally process the collected data. Depending on the results, the proprietary program may encrypt and transmit final values from the satellite 120 to one or more ground stations 130 to perform additional or supplemental operations as dictated by operative commands in the proprietary code.

Figure 9:
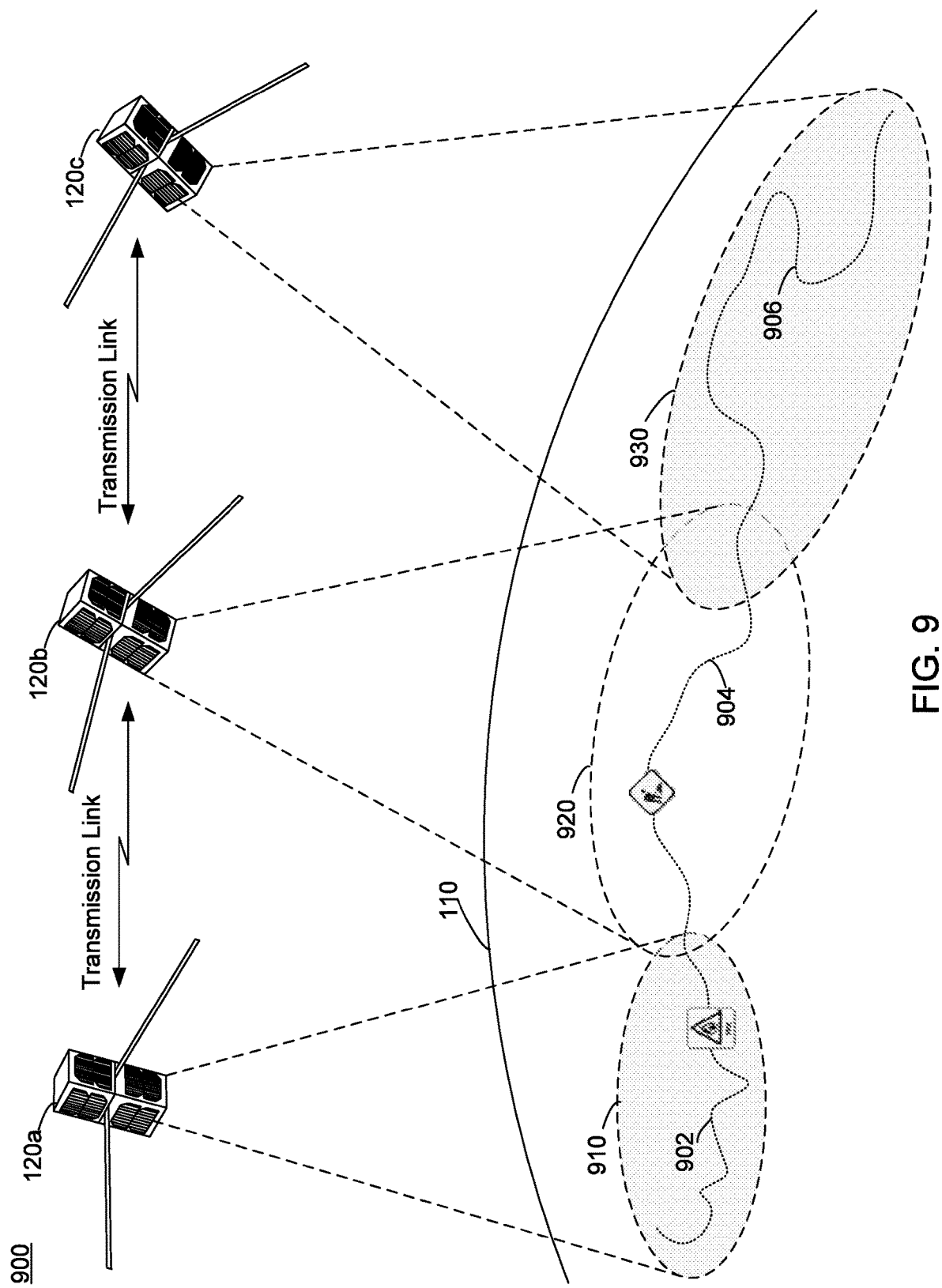
FIG. 9 illustrates multiple satellites executing a third party's proprietary program to capture snapshots of oil pipelines in different regions according to one aspect of the present technology.

By way of example, with reference to FIG. 9, an oil company may lease satellite time to collect data of oil pipelines 902, 904 and 906 in several remote regions 910, 920 and 930. Proprietary programs by the oil company may be loaded to one or more satellites 120a, 120b, and 120c. Upon instantiation of the proprietary programs, the satellites 120a, 120b and 120c may start to collect data of regions 910, 920 and 930, such as by taking infrared snapshots of these regions. The satellites 120a, 120b and 120c may perform real time proprietary analysis upon collection of the data to monitor conditions of the oil pipelines 902, 904 and 906. For instance, as illustrated in FIG. 9, the satellite 120a by analyzing a snapshot of the region 910 may determine that a fire occurs along the oil pipeline 902. Similarly, the satellite 120b by analyzing a snapshot of the region 920 may determine that the pipeline 904 is under construction. The satellite 120c by analyzing a snapshot of the region 930 may determine that the pipeline 906 is in a normal state. Based on its analysis, each satellite may provide prompt notification to the oil company reporting any abnormal state of the pipeline. For instance, the satellites 120a and 120b may notify the ground station 130, which in turn may notify the oil company, about the fire and construction along pipelines 902 and 904. Specifically, the satellites 120a and 120b may broadcast snapshots of regions 910 and 920 which in turn may be received by the oil company through the ground station 130. Since the satellite 120c does not detect any abnormal state along the pipeline 906, the satellite 120c may not need to send any notification, or may send a notification reporting a normal status.

Figure 10:
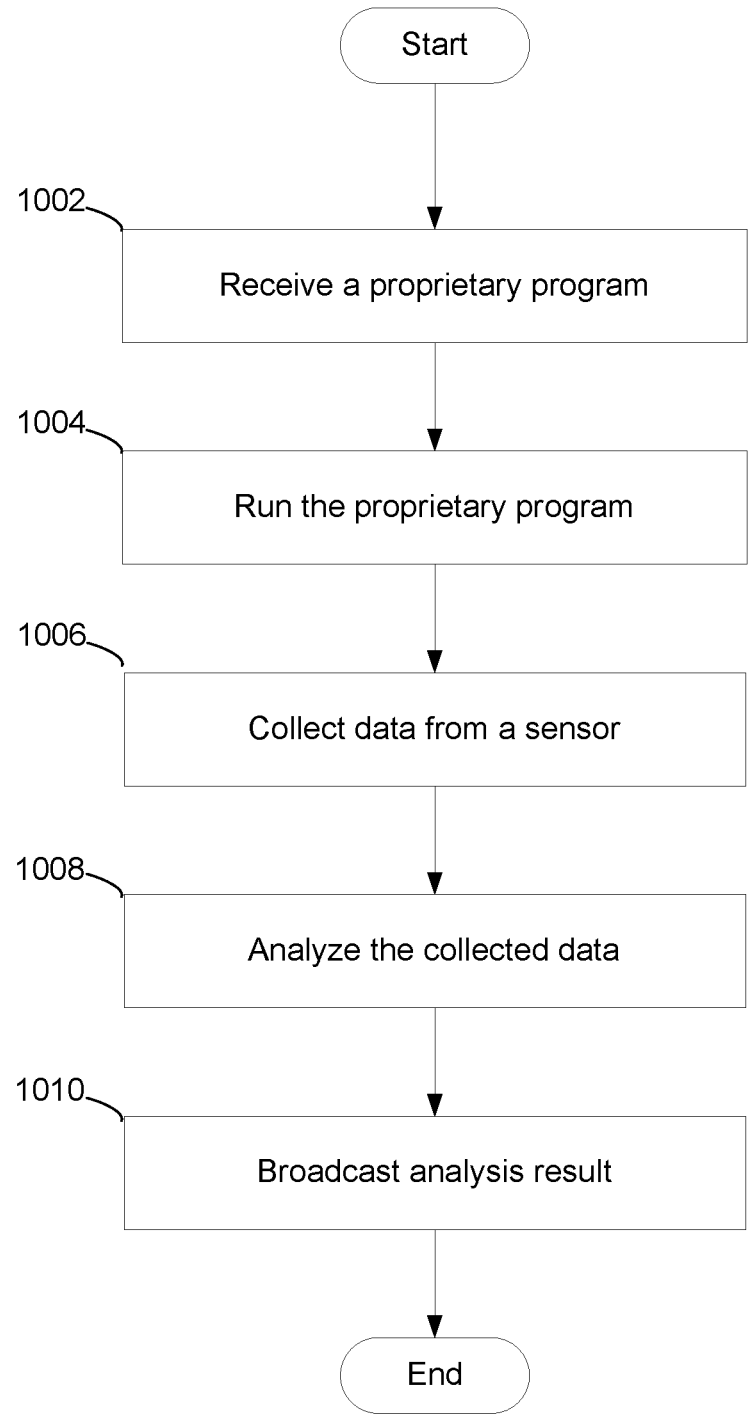
FIG. 10 is a flow chart illustrating operations for leasing a satellite's on-board access.

FIG. 10 is a flow chart illustrating operations for leasing an on-board access by a satellite 120. Steps described herein may be performed by a processor located in the satellite 120. At 1002, the satellite 120 may receive a proprietary program provided by a third party. The satellite 120 may be regarded as a lender that leases the satellite execution power, whereas the third party may be regarded as a borrower of the satellite execution power. The proprietary program may be uploaded by the third party borrower through a ground station 130 during flight of the satellite 120. Alternatively, the satellite 120 may be preloaded with the third party's proprietary program before flight. At 1004, the satellite 120 may run the proprietary program according to a pre-selected window of time. In the alternative, the satellite 120 may run the proprietary program in response to a remote command sent by the third party borrower through the ground station 130. At 1006, the satellite 120 may collect data by using one or more onboard sensors in response to instructions of the proprietary program. For example, the proprietary program may instruct the satellite 120 to take frequent infrared snapshots of one or more regions on the planet 110. At 1008, the satellite 120 may analyze the collected data. At 1010, the satellite 120 may broadcast analysis result. In the oil pipeline scenario, the satellite 120 may transmit an incident location where issues are detected along the pipelines to achieve near real-time detection. One or more ground stations 130 may receive the information broadcast from the satellite 120, and relay the information to the third party borrower.

In one embodiment, the satellite 120 may serve as a highly-secure data storage server because the extraplanetary location of the data may make seizure by governmental or private parties infeasible. A third party borrower may rent a storage space on the satellite 120. The third party borrower may determine how to dispose of the data. For example, the data stored in the satellite 120 may be accessed upon a proper entry of an access code. The data may also be destroyed automatically if an unacceptable access code is entered. In some embodiments, the data may disintegrate over time without recovery. Further, the data can be physically destroyed by allowing the satellite 120 to fall from orbit and burn up in the planet's 110 atmosphere. To upload the data to the satellite 120, a ground station 130 may perform broadcast of data with open protocols to the satellite 120 either automatically according to a schedule or on request.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A receive-only ground station, comprising:
   a software-defined radio (SDR) system configured to modulate and demodulate radio signals;
   a clock synchronized with a satellite;
   a non-transitory storage medium storing a program schedule specifying a predetermined period of time for receiving incoming data from the satellite; and
   a processor in communication with the SDR system, the processor configured to:
   receive, via the SDR system and as broadcast by the satellite during the predetermined period of time as specified by the program schedule, a stream of the incoming data, wherein the satellite automatically initiates broadcast of the stream of the incoming data to the ground station during the predetermined period of time and without instruction from the ground station to the satellite prompting the broadcast; and
   as the ground station receives the stream of incoming data, and without interrupting the stream of incoming data, redirect the stream of the incoming data to a central command center.

2. The receive-only ground station of claim 1, further comprising a stationary omni-directional antenna configured to receive incoming data from a plurality of satellites.

3. The receive-only ground station of claim 1, wherein the processor redirects the incoming data to the central command center without a stop and resend command.

4. The receive-only ground station of claim 1, wherein the processor redirects the incoming data to the central command center via Ethernet.

5. A method of receiving a broadcast of a stream of data at a receive-only ground station that is automatically initiated by a satellite during a scheduled period of time without instruction by the ground station, the method performed by the ground station comprising:

initiating receipt of the stream of data broadcast by the satellite at the onset of the scheduled period of time based on a clock of the ground station that is synchronized with a clock of the satellite and a program schedule contained in a non-transitory storage medium of the ground station that defines the scheduled period of time using a processor of the ground station;

receiving the stream of data broadcast by the satellite over the scheduled period of time using a software-defined radio system and the processor of the ground station; and redirecting the received stream of data to a central command center during receiving the stream of data using the processor.

6. The method of claim 5, wherein receiving the stream of data comprises receiving the stream of data using a stationary omni-directional antenna of the ground station.

7. The method of claim 5, wherein redirecting the received stream of data occurs without a stop and resend command.

8. The method of claim 5, wherein redirecting the received stream of data comprises transmitting the received stream of data to the central command center via Ethernet.

9. A method of communicating a stream of data between a satellite and a receive-only ground station comprising:

automatically initiating a broadcast of a stream of data by the satellite at an onset of a scheduled period of time based on a clock of the satellite without instruction from the ground station;

initiating receipt of the stream of data broadcast by the satellite at the onset of the scheduled period of time based on a clock of the ground station that is synchronized with the clock of the satellite and a program schedule contained in a non-transitory storage medium of the ground station that defines the scheduled period of time using a processor of the ground station;

receiving the stream of data broadcast by the satellite over the scheduled period of time using a software-defined radio system and the processor of the ground station; and redirecting the received stream of data to a central command center during receiving the stream of data using the processor.

10. The method of claim 9, wherein receiving the stream of data comprises receiving the stream of data using a stationary omni-directional antenna of the ground station.

11. The method of claim 9, wherein redirecting the received stream of data occurs without a stop and resend command.

12. The method of claim 9, wherein redirecting the received stream of data comprises transmitting the received stream of data to the central command center via Ethernet.

* * * * *